June 26, 1923.  1,460,112

G. QUARFOTH

CAMERA

Filed Aug. 4, 1922  2 Sheets-Sheet 1

WITNESS
Geo Schwarz

INVENTOR
Gunnar Quarfoth
BY
Redding Greeley
ATTORNEYS

June 26, 1923. 1,460,112
G. QUARFOTH
CAMERA
Filed Aug. 4, 1922 2 Sheets-Sheet 2
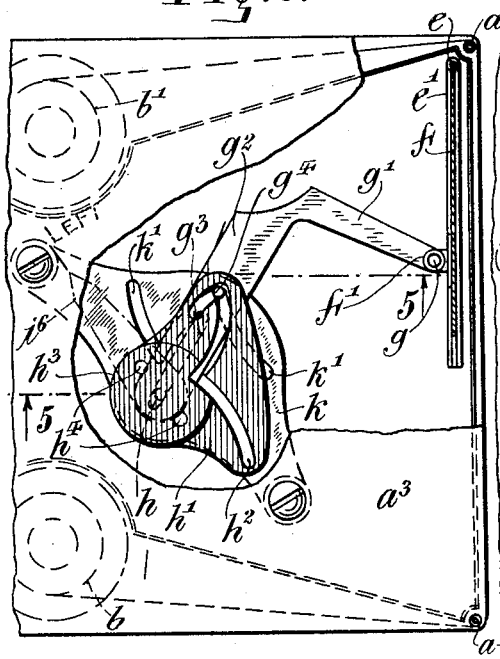
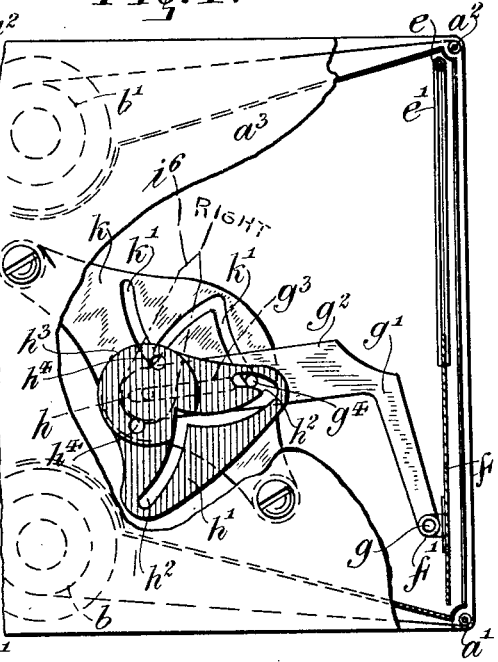
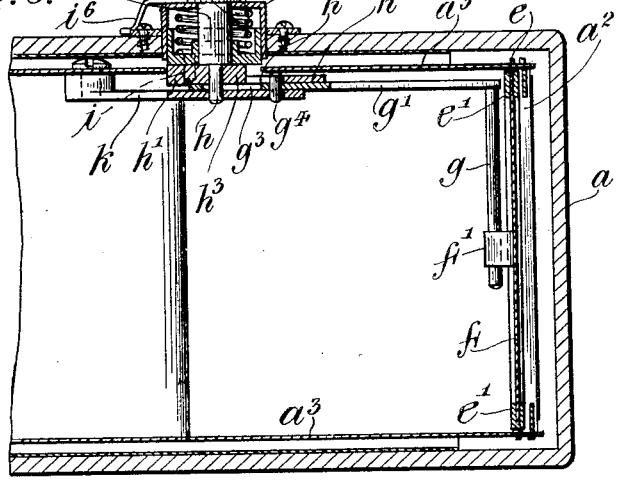

Patented June 26, 1923.

1,460,112

UNITED STATES PATENT OFFICE.

GUNNAR QUARFOTH, OF NEW ROCHELLE, NEW YORK.

CAMERA.

Application filed August 4, 1922. Serial No. 579,555.

*To all whom it may concern:*

Be it known that I, GUNNAR QUARFOTH, a subject of the King of Sweden, residing in the city of New Rochelle, county of Westchester, and State of New York, have invented certain new and useful Improvements in Cameras, of which the following is a specification, reference being had to the accompanying drawings, forming a part hereof.

This invention has for its object to provide improved means whereby, in a photographic camera, either the whole or one part or another part of the sensitized surface, whether of film or plate, can be exposed when the shutter is open, so that the photographer may make a negative which shall cover the whole of the plate or film, or may make two negatives, in succession, upon one portion and another portion of the same film. Not only can economy in the use of the plate or film be practiced thereby, but it is possible to make upon one film or plate, side by side, negatives of two different objects or of the same object as seen from different points of view. In accordance with the invention a secondary movable shutter or mask is arranged in operative relation with respect to the sensitized surface and operating and guiding means are provided therefor so that such shutter or mask may stand in close proximity to one part or the other part of the sensitized surface, so as to exclude light therefrom, leaving the other part to be exposed when the primary shutter is open, or may be moved out of the path of light between the lens and the sensitized surface so that the whole of such surface shall be exposed when the primary shutter is open.

The invention will be explained more fully hereinafter with reference to the accompanying drawings in which it is illustrated, and in which—

Figures 3 and 4 are partial views, similar to Figure 2, illustrating different positions of the shutter actuating mechanism.

Figure 5 is a partial view in horizontal section, on the plane indicated by the broken line 5—5 of Figure 3.

Figure 1:
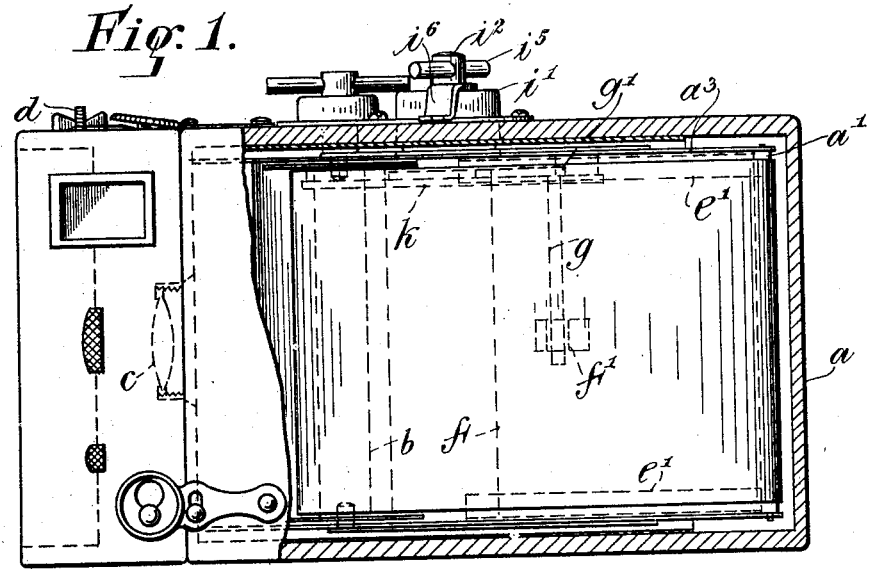
Figure 1 is a top view, partly in horizontal section, of a box camera, otherwise of ordinary construction, equipped with the present improvement.

The improvement is illustrated in the drawings as applied to a box camera of ordinary construction and adapted for a film, having a box-like casing $a$, film spools $b$ and $b'$, and guides $a'$ and $a^2$ for the film as it passes from one spool to the other. The position of the usual object lens is indicated by broken lines at $c$ in Figures 1 and 2, the position of the usual primary shutter being indicated by its operating means at $d$. Pivoted at $e$, at one corner of the casing $a$, is a rectangular U-shaped or three-sided guide frame, the side members $e'$ of which are grooved to support and guide in its movements the secondary shutter $f$, the purpose of which is to mask one part or another of the sensitized surface of the film or plate. The guide frame $e$, $e'$ swings freely upon its pivot and the secondary shutter or mask $f$ slides freely in the guide frame under the influence of the operating mechanism to be described. Normally the frame and the mask or secondary shutter stand in the position shown in Figure 2, so that the entire sensitized surface of the film or plate, at the rear of the camera box, is exposed when the primary shutter is open. The first movement of the operating mechanism swings the frame $e$, $e'$ to the position shown in Figure 3, when the secondary shutter or mask $f$ stands close to the sensitized surface and protects the same from exposure when the primary shutter is opened, so that the negative image is formed only on the other part of the sensitized surface. A further movement of the operating means causes the secondary shutter or mask $f$ to slide in the guide frame $e$, $e'$ from the position shown in Figure 3 to the position shown in Figure 4, in which position it masks the other or left hand portion of the sensitized surface, leaving the right hand portion exposed. On the inner or under side of the mask $f$ is formed an eye $f'$ which is engaged by a rod $g$. The latter is carried by a substantially right angled arm $g'$, the member $g^2$ of which is slotted longitudinally as shown at $g^3$, in full lines in Figure 5 and in broken lines in Figures 2, 3 and 4, to engage the spindle $h$ of the operating cam $h'$. The latter is formed with an actuating cam slot $h^2$ to engage a pin $q^4$ fixed in the arm $g^2$. For convenience in manufacture the hub $h^3$ of the actuating cam is formed with holes $h^4$ for engagement with corresponding pins $i$ of a head $i'$ secured to an operating spindle $i^2$ which is mounted in a casing $i^3$ secured to the casing $a$ of the camera, a spring $i^4$ serving to hold the head $i'$ in engagement with the hub $h'$ of the actuating cam, but permitting disengagement when the inner casing $a^3$ is to be removed, with the parts carried thereby, from the outer casing $a$.

Fixed to the inner casing $a^3$, and suitably spaced therefrom is a cam plate $k$ formed with a generally Z-shaped cam slot $k'$, with which is engaged the pin $g^4$ carried by the arm $g^2$ and having its other end engaged in the cam slot $h^2$ of the actuating cam $h'$.

The operating spindle $i^2$ is provided with a suitable handle $i^5$ and with a pointer $i^6$.

Figure 2:
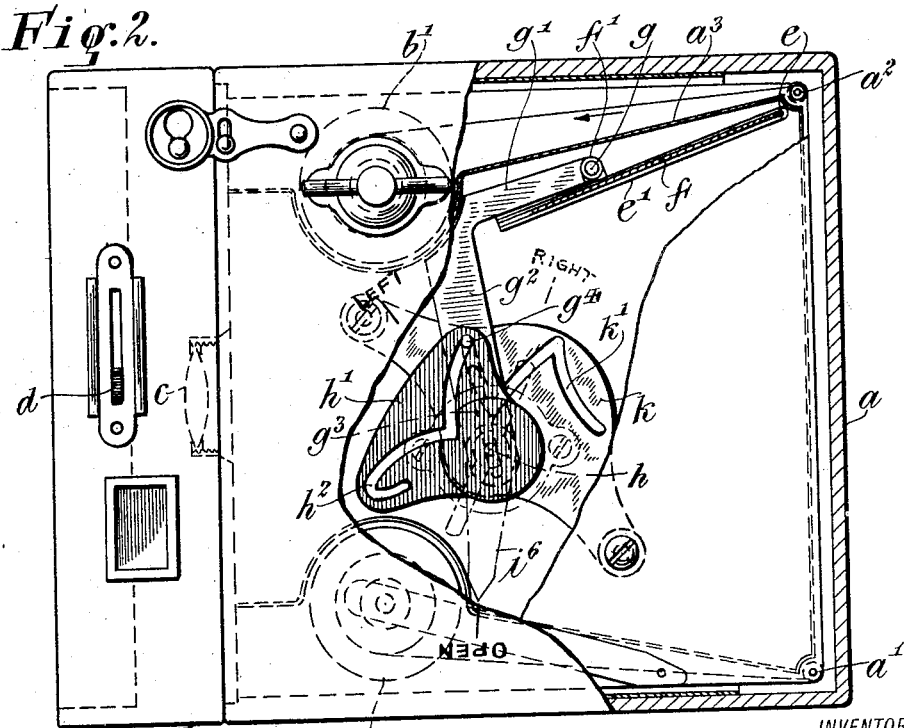
Figure 2 is a view of the same partly in side elevation and partly in vertical section.

When the parts are in the position shown in Figure 2, with the pointer at "open" the guide frame $e$, $e'$ stands close to the side of the inner casing $a^3$, with the mask $f$ as also shown in said figure. With the movement of the operating spindle to the position indicated in Figure 3, with the pointer at "left," the arm $g^2$ is caused first to slide inward, is then swung upon the spindle $h$ as an axis, and is then caused to slide outward and at the same time to be swung slightly upon the same axis, whereby the guide frame $e$, $e'$ is swung from the position shown in Figure 2 to the position shown in Figure 3 with the mask $f$ masking the right hand side of the sensitized surface of the film or plate, the left hand part of the surface being at the same time exposed when the primary shutter at $d$ is opened. In this movement the pin $g^4$ is guided in the first two portions of the slot $k'$ of the fixed or guiding cam $k$.

If now the movement of the operating handle be continued until the pointer $i^6$ reaches the point marked "right," the movement of the arm $g^2$ by the actuating cam is continued, the pin $g^4$ being guided in the third portion of the cam grove $k'$, so that the mask $f$ is drawn in the guide frame $e$, $e'$ from the position shown in Figure 3 to the position shown in Figure 4, thereby masking the left hand portion of the sensitized surface and leaving the right hand portion exposed. When the movement of the operating spindle is reversed, the mask will be moved from the position shown in Figure 4 first to the position shown in Figure 3 and then to the position shown in Figure 2.

It will be understood that the construction and arrangement of the operating mechanism will be varied to suit different cameras and that the invention, except as pointed out in the accompanying claims, is not limited to the precise construction and arrangement shown and described herein.

I claim as my invention:

1. In a camera, the combination of a casing, a mask, means to support the mask to swing in the casing, an arm connected to the mask, and cam mechanism for actuating the arm to cause the mask to swing from one position to another.

2. In a camera, the combination of a casing, a mask, a guide in which the mask is free to slide, an arm connected to the mask, and cam mechanism for actuating the arm to cause the mask to slide from one position to another.

3. In a camera, the combination of a casing, a mask, means to support the mask to swing in the casing, an arm connected to the mask, a fixed guide cam engaged with the arm, a movable actuating cam also engaged with the arm, and operating means for the actuating cam.

4. In a camera, the combination of a casing, a mask, a guide frame in which the mask is freely movable, an arm connected to the mask, a fixed guide cam engaged with the arm, a movable actuating cam also engaged with the arm, and operating means for the actuating cam.

5. In a camera, the combination of a casing, a mask, a swinging frame in which the mask is freely movable, an arm connected to the mask and a cam mechanism for actuating the arm to cause the mask to swing from one position to another and to slide from one position to another.

6. In a camera, the combination of a casing, a mask, a swinging frame in which the mask is freely movable, an arm connected to the mask, a fixed guide cam engaged with the arm, and a movable actuating cam also engaged with the arm, and operating means for the actuating cam.

7. In a camera, the combination of a casing, a movable mask, an actuating arm connected to the mask, the arm being free to swing and to slide, a fixed guide cam engaged with the arm, and operating means for the actuating cam.

GUNNAR QUARFOTH.

Witness:
WILLIAM J. VAN WINKLE.